(12) United States Patent
Rago

(10) Patent No.: US 7,043,898 B2
(45) Date of Patent: May 16, 2006

(54) COMBINED EXHAUST DUCT AND MIXER FOR A GAS TURBINE ENGINE

(75) Inventor: Giuseppe Rago, Mississauga (CA)

(73) Assignee: Pratt & Whitney Canada Corp., Longueuil (CA)

( * ) Notice: Subject to any disclaimer, the term of this patent is extended or adjusted under 35 U.S.C. 154(b) by 549 days.

(21) Appl. No.: 10/600,867

(22) Filed: Jun. 23, 2003

(65) Prior Publication Data

US 2004/0255573 A1 Dec. 23, 2004

(51) Int. Cl.
   *F02K 1/38* (2006.01)
   *F02K 3/04* (2006.01)

(52) U.S. Cl. ............. 60/262; 60/264; 239/265.17; 181/220; 29/890.01

(58) Field of Classification Search .............. 60/262, 60/264; 239/265.17; 181/213, 220; 29/890.01
   See application file for complete search history.

(56) References Cited

U.S. PATENT DOCUMENTS

| | | | | |
|---|---|---|---|---|
| 3,053,340 A | 9/1962 | Kutney | ........................ | 181/33 |
| 3,647,021 A | 3/1972 | Millman et al. | ....... | 181/33 HC |
| 4,117,671 A | 10/1978 | Neal et al. | ..................... | 60/262 |
| 4,165,609 A | 8/1979 | Rudolph | ...................... | 60/262 |
| 4,175,640 A * | 11/1979 | Birch et al. | ................. | 181/213 |
| 4,226,085 A * | 10/1980 | Johnson | ........................ | 60/262 |
| 4,335,801 A | 6/1982 | Stachowiak et al. | ........ | 181/213 |
| 4,422,524 A * | 12/1983 | Osborn | ........................ | 181/215 |
| 4,481,698 A | 11/1984 | Salerno | ................. | 29/156.8 R |
| 4,664,593 A * | 5/1987 | Hayashi et al. | ............. | 415/119 |
| 4,813,230 A | 3/1989 | Braithwaite | .................. | 60/262 |
| 5,265,807 A | 11/1993 | Steckbeck et al. | ..... | 239/265.11 |
| 5,440,875 A | 8/1995 | Torkelson et al. | ......... | 60/226.1 |
| 5,771,681 A | 6/1998 | Rudolph | ....................... | 60/262 |
| 5,826,794 A | 10/1998 | Rudolph | ................ | 239/265.17 |
| 5,908,159 A | 6/1999 | Rudolph | ................ | 239/265.17 |

* cited by examiner

Primary Examiner—Charles G. Freay
(74) Attorney, Agent, or Firm—Ogilvy Renault LLP

(57) ABSTRACT

A gas turbine engine including a gas exhaust duct assembly which comprises an annular shroud forming at least a section of an inner wall of a gas exhaust duct, a plurality of strut members radially projecting from the shroud, and a plurality of insert members. The strut members are disposed in a circumferentially, substantially equally spaced-apart relationship, and extend in a substantially axial direction. The insert members each define a circumferential section of an outer wall of the gas exhaust duct and are positioned in a space between adjacent strut members, and are secured to same. The gas exhaust duct is thereby defined between inner surfaces of the insert members and the outer surface of the shroud, and is circumferentially divided by the respective strut members, for directing exhaust gases rearwardly in an axial direction, meanwhile surrounding flow passages are defined by outer surfaces of the insert members and the strut members in combination, for directing surrounding air flows rearwardly in an axial, radial and inward direction.

24 Claims, 4 Drawing Sheets

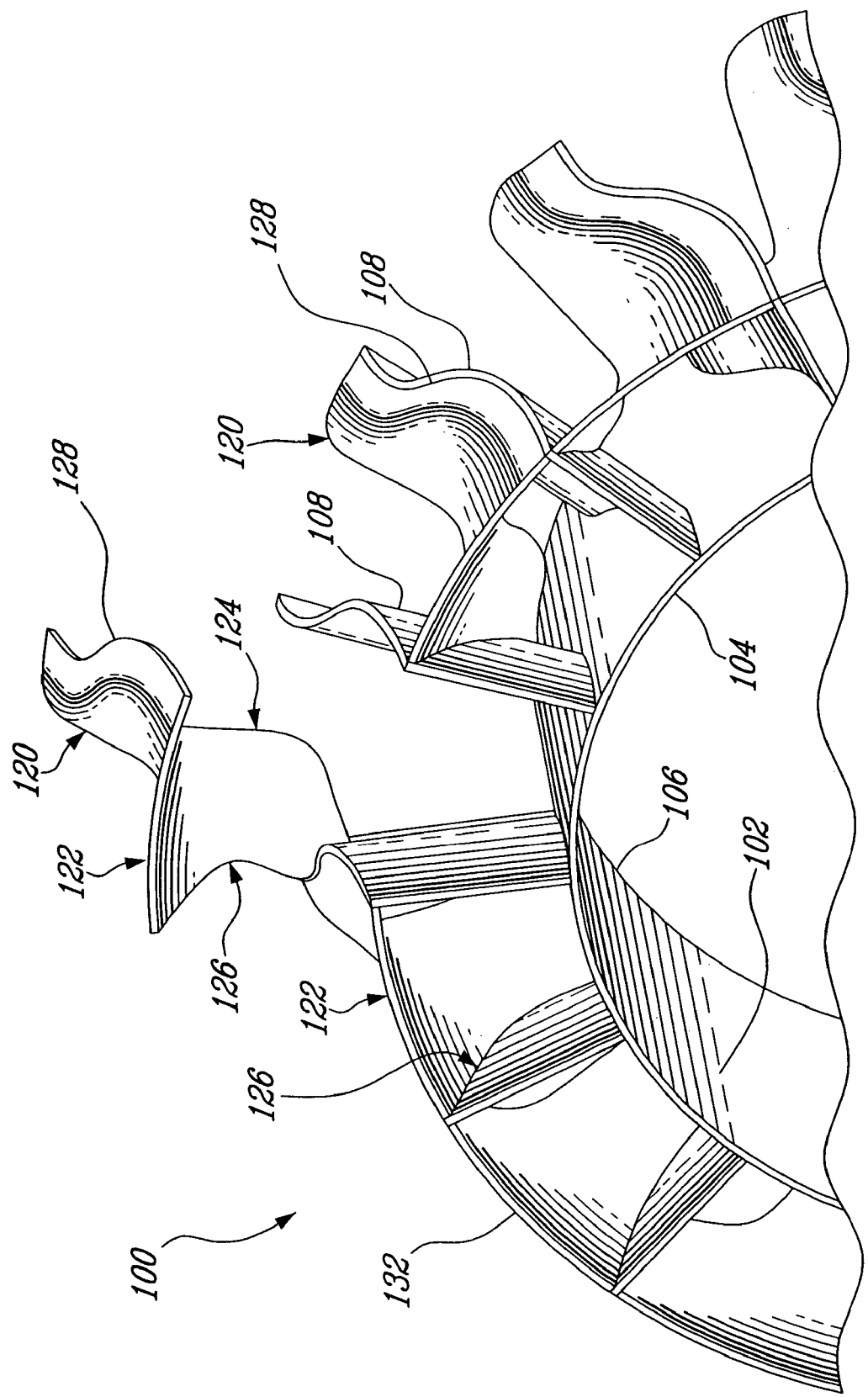

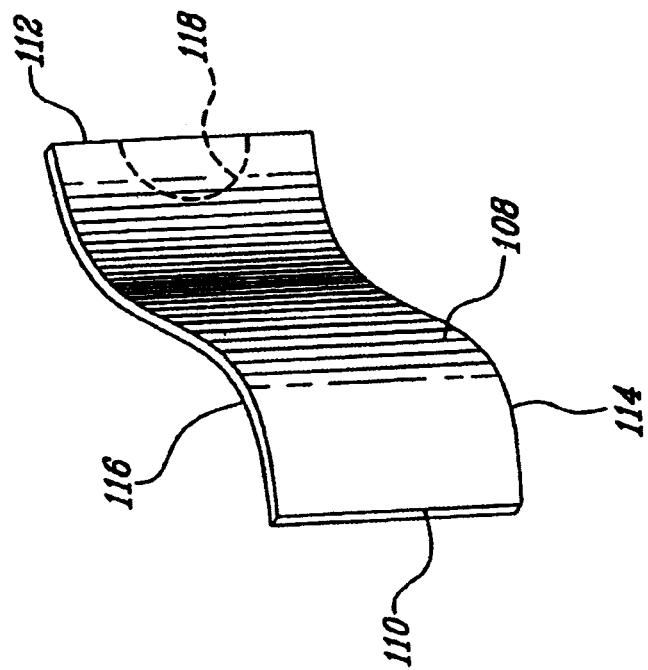
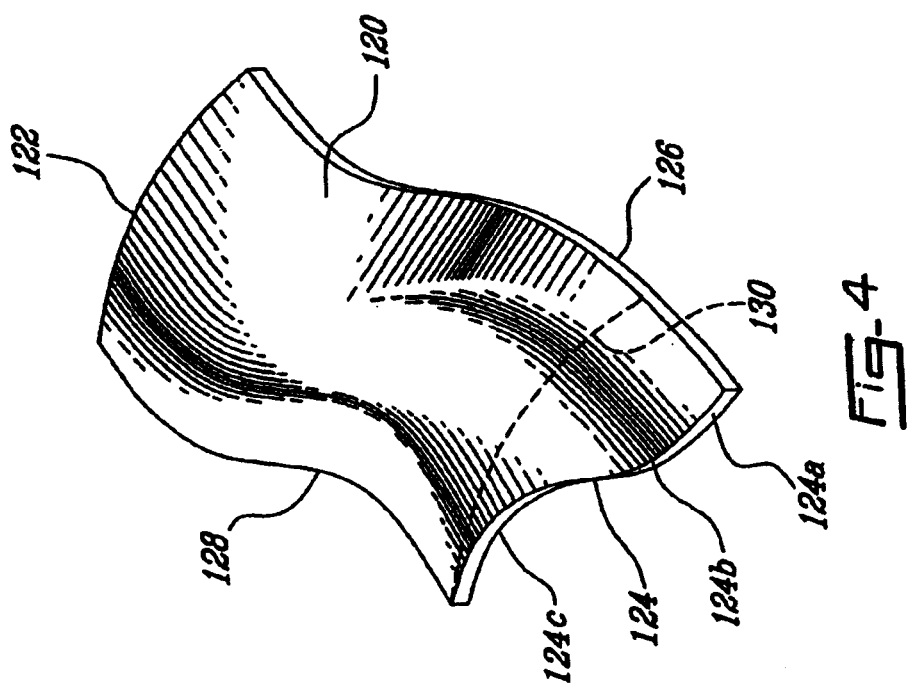

COMBINED EXHAUST DUCT AND MIXER FOR A GAS TURBINE ENGINE

FIELD OF THE INVENTION

This invention relates to bypass gas turbine engines and more particularly to combining an exhaust duct and mixer for such engines.

BACKGROUND OF THE INVENTION

In the course of gas turbine engine development various dynamic concepts have evolved which require the mixing of two separate gas flows, such as bypass duct flow and exhaust gases, in an efficient manner. This mixing is required because the two gas flows are at widely varying temperatures and/or pressures and they must be combined together to form a single homogeneous flow of gases in order to reduce exhaust gas noise. A number of different noise suppression and gas mixing nozzles have been developed for use with aircraft gas turbine engines, some of which are independently attached to the engine around the engine exhaust duct, and some of which are combined with the engine exhaust duct. Nevertheless, the engine exhaust duct functions not only to discharge exhaust gases but also as a stationary support structure supporting for example, the turbine rotor bearing assembly. Therefore the engine exhaust duct is usually separated from the noise suppression and gas mixer in terms of either function or structure, and the engine exhaust duct with the noise suppression mixer usually requires a certain axial length for proper functioning.

Multi-lobed sound suppression shrouds are well known in the industry. Some of these are fabricated by a pressing process to form corrugations on a metal blank. One example of these is disclosed in U.S. Pat. No. 4,481,698, issued to Salerno on Nov. 13, 1984. Salerno employs a mechanical press with male and female die portions to form convolutions in a generally continuous circular ring blank. Other multi-lobed noise suppression mixers are fabricated by welding modular components together. For example, Stachowiak et al. disclose in their U.S. Pat. No. 4,335,801, issued on Jun. 22, 1982, a multi-lobe type noise suppressing nozzle having modular components welded together. This composite construction is provided to permit the addition of thickened lobe sidewall sections interconnected by inter-struts. The internal struts together with the thickened sidewall portions of the lobes define a structural ring providing hoop and bending strength at the center of the nozzle. The lobes of a multi-lobe type noise suppressing nozzle are generally unsupported and are subject to vibration and excessive deflections when in use. Therefore means for stiffening the lobes are usually required. For example, in U.S. Pat. No. 5,265,807, issued to Steckbeck et al. on Nov. 30, 1993, a circumferential stiffening ring is secured to the aft end of the mixer to reduce or prevent vibration while circumferentially enhancing the mixing of cool ambient air with the hot engine exhaust.

Modular components are also used to form other types of gas turbine mixers. For example, in U.S. Pat. No. 4,165,609, issued to Rudolph on Aug. 28, 1979, a tubular exhaust mixer includes a plurality of generally flat metal strips that extend axially and a plurality of vanes positioned between adjacent metal strips, in order to form first axially extending regions that induce fan air to flow radially inwardly, and second axially extending regions that induce primary exhaust gas to flow radially outwardly in order to penetrate the fan air stream. The two axially extending regions are circumferentially interspaced.

Although various types of engine exhaust ducts and noise suppression gas mixers have been developed, there is still a need for improved configurations of exhaust ducts and gas mixers. In particular, as gas turbine engines become smaller and approach general acceptance in General Aviation markets, there is now—more than ever—a need to provide gas turbine engines which are smaller, lighter, more reliable and, importantly, cheaper to produce and operate.

SUMMARY OF THE INVENTION

One object of the present invention is to provide a lower cost and smaller structure of a gas exhaust duct and mixer for a gas turbine engine and a method for fabricating same.

In accordance with one aspect of the present invention a noise suppression mixer is provided for use with an aircraft gas turbine engine, which comprises a cylindrical shroud adapted to form a section of an inner wall of a gas exhaust duct, and a plurality of air foils, each being made of a plate having a front end, a rear end, an inner side and an outer side. The respective air foils are secured to an outer surface of the shroud in a circumferentially, substantially equally spaced-apart relationship. A plurality of twisted inner plates are provided, and each has a front edge, a rear edge, and first and second side edges. Each insert plate is positioned in a space between adjacent air foils and is secured to the adjacent air foils, thereby in combination with the adjacent air foils forming a first flow passage for directing exhaust gases rearwardly in an axial direction, and a second flow passage for directing a surrounding airflow rearwardly in an axial, radial and inward direction when the mixer assembly is installed on the engine.

In accordance with another aspect of the present invention, a method of fabricating the noise suppression mixer assembly comprises steps of: providing the cylindrical shroud; forming the individual air foils; forming the individual insert plates thereby defining a curved surface at each side thereof; mounting the air foils to the cylindrical shroud on an external surface thereof in a circumferentially, substantially equally spaced-apart relationship; placing one of the insert plates into position and securing the insert plate to the adjacent air foils, thereby in combination with the adjacent air foils forming the first and second flow passages; and repeating the placing and securing of the insert plates until the mixer assembly is completed.

In accordance with a further aspect of the present invention, there is provided a gas turbine engine for use with aircraft including a gas exhaust duct assembly positioned downstream of a turbine rotor assembly with respect to a flow path through the engine. The gas exhaust duct assembly comprises a cylindrical shroud forming at least a section of an inner wall of a gas exhaust duct. A plurality of air foils radially project from an outer surface of the shroud. The air foils are disposed in a circumferentially, substantially equally spaced-apart relationship, and extend in a substantially axial direction. A plurality of twisted insert plates are provided and each defines a circumferential section of the outer wall of the gas exhaust duct, and is positioned in a space between adjacent air foils, and is secured to the adjacent air foils. Therefore, the gas exhaust duct is defined between the inner surfaces of the insert plates and the outer surface of the shroud, being circumferentially divided by the respective air foils, for directing exhaust gases rearwardly in an axial direction. Meanwhile, surrounding flow passages are defined by the outer surfaces of the insert plates and the air foils in combination for directing surrounding air flow rearwardly in an axial, radial and inward direction. The gas exhaust duct assembly preferably comprises a mounting flange secured to a turbine casing surrounding the turbine rotor. It is also preferable that the gas exhaust duct assembly further comprises means attached to the cylindrical shroud for supporting a turbine rotor bearing assembly.

The duct and mixer structure in accordance with the present invention is preferably rigid and strong enough to support the rear bearing cavity which accommodates turbine bearing assemblies such that the duct and mixer structure performs a duel function acting as a mixer to aerodynamically direct the hot and cold gases for mixing together, and acting as an exhaust duct for directing exhaust gases and supporting stationary structures. Therefore, the duct and mixer structure of the present invention advantageously requires only a short length thereof in contrast to the conventional exhaust duct and mixer, and thereby significantly reduces the manufacturing costs and the overall weight thereof, thus providing a significant advantage to aircraft which are equipped with gas turbine engines provided in accordance with the present invention.

Other advantages and features of the present invention will be better understood with reference to preferred embodiment described hereinafter.

BRIEF DESCRIPTION OF THE DRAWINGS

Having thus generally described the nature of the present invention, reference will now be made to the accompanying drawings, showing by way of illustration the preferred embodiments thereof, in which:

FIG. 3 is a partial perspective view of an uncompleted and partially exploded duct and mixer assembly during a fabrication process;

FIG. 4 is a top and rear perspective view in an enlarged scale, of an insert plate used in the duct and mixer assembly of FIG. 3; and FIG. 5 is a top and side elevational view in an enlarged scale, of a air foil used in the duct and mixer assembly of FIG. 3.

DETAILED DESCRIPTION OF THE PREFERRED EMBODIMENTS

Figure 1:
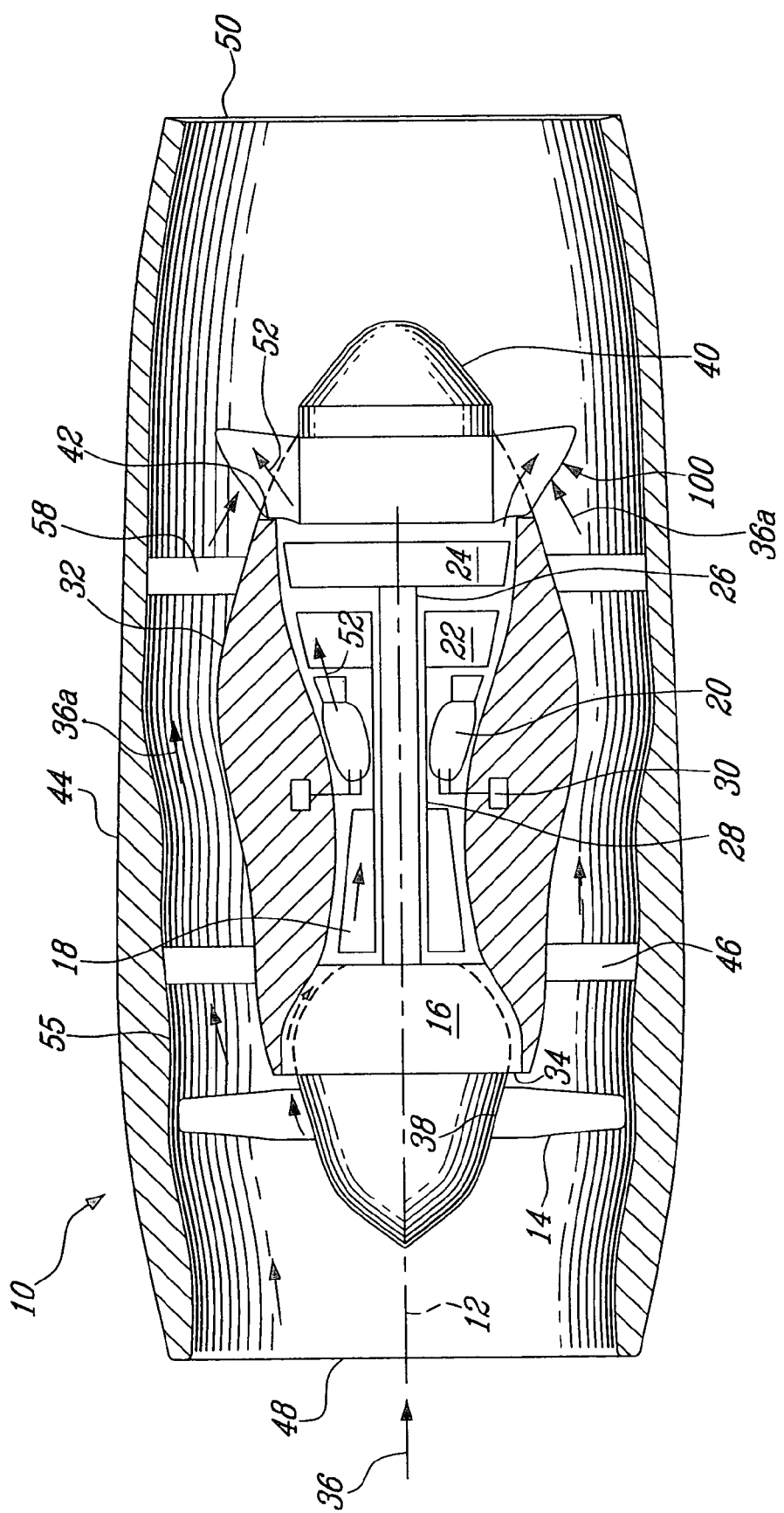
FIG. 1 is a longitudinal cross-sectional schematic view of a gas turbine engine incorporating one embodiment of the present invention.

Referring to the drawings, particularly FIG. 1, an exemplary gas turbine engine 10 includes in serial flow communication about a longitudinal central axis 12, fan or rotor blades 14, a conventional low pressure compressor 16, a conventional high pressure compressor 18, a conventional annular combustor 20, a conventional high pressure turbine 22, and a conventional low pressure turbine 24. The low pressure turbine 24 is securely connected to both the low pressure compressor 16 and the fan blades 14 by a first rotor shaft 26, and the high pressure turbine 22 is securely connected to the high pressure compressor 18 by a second rotor shaft 28. Conventional fuel injecting means 30 are provided for powering the engine 10.

A conventional annular casing 32 surrounds the engine 10 from the low pressure compressor 16 to the low pressure turbine 24 and defines, with the low pressure compressor 16, a low pressure compressor inlet 34 for receiving a portion of ambient air 36 therethrough. A duct and mixer assembly 100 is secured to the downstream end 42 of the casing 32, and defines with a conventional tail plug 40, an annular cone exhaust nozzle. A portion of the ambient air 36 compressed by the fan blades 14 adjacent to the blade roots 38, is further compressed by the low pressure compressor 16 and the high pressure compressor 18, and is forced into the combustor 20. The mixture of the compressed air 36 and fuel injected by the fuel injecting means 30 generates combustion gases 52. The combustion gases 52 cause the high pressure turbine 22 and the low pressure turbine 24 to rotate respectively for powering the high pressure compressor 18, the low pressure compressor 16 and the fan blades 14. Surrounding the blades 14 and the upstream portion of the casing 32 is a nacelle 44 which is spaced radially outwardly from the casing 32 in order to define with the casing 32, an annular bypass-duct 55 for permitting the radially outer portion of the ambient air 36 compressed by the fan blades 14 to bypass the engine 10, which is referred to as bypass-duct airflow 36a. A plurality of circumferentially spaced stator vanes 46 extend radially between the casing 32 and the nacelle 44, and are spaced apart axially downstream of the fan blades 14. A plurality of circumferentially spaced stator vanes 58 extend radially between the casing 32 and the nacelle 44, and are spaced apart axially downstream of the stator vanes 46. The nacelle 44 includes an inlet 48 at its upstream end for receiving the ambient air 36 and an outlet 50 at its downstream end for discharging a flow mixture of combustion gases 52 and the bypass-duct airflow 36a, for providing the total amount of the thrust generated by the engine 10.

The mixed gas flow discharged from the outlet 50 achieves a higher mass-velocity product than the combustion gases 52 alone, to improve the engine thrust, and a lower velocity than the velocity of the combustion gases 52, thus reducing the jet exhaust noise level.

Referring to FIGS. 2–5, the duct and mixer assembly 100 is employed to enhance the mixing of the bypass-duct airflow 36a and the combustion gases 52 in the downstream end portion of the nacelle 44. The duct and mixer assembly 100 generally includes a short section of cylindrical shroud 102 preferably made of sheet metal. The cylindrical shroud 102 has a front end 104 and a rear end 106.

A plurality of air foils 108 are provided, each being made of a plate having a front end 110, a rear end 112, an inner side 114 and an outer side 116. The air foil 108 is preferably made of cast or sheet metal, and is formed with a "wave" shape between the front and rear ends 110, 112 thereof. The selection of a shape for airfoil 108 will be described in more detail. The rear end 112 optionally has a cut-out which is indicated by broken line 118 in FIG. 5 and solid line 118 in FIG. 2. The air foils 108 are mounted in a radially projecting position to the cylindrical shroud 102 on an external surface (not indicated) thereof in a circumferentially, substantially equally spaced-apart relationship, preferably by a welding process.

A plurality of insert "plates" 120 are provided and each is made of a plate, preferably sheet metal, having a front edge 122, a rear edge 124, first and second side edges 126, 128. The insert plate 120 is fabricated preferably in a cutting and pressing operation to form a specially-designed configuration. (The term "plate" used herein is not intended to refer strictly to a planar prismatic shape, as will be understood by the skilled reader in light of this description).

The front edge 122 is slightly curved having a radius substantially equal to the sum of the radius of the cylindrical shroud 102 and the height of the air foil 108 which extends between the inner and outer side edges 114 and 116 thereof. The rear edge 124 is twisted into a substantially "S" shape, including a section 124a significantly displaced in one direction from the original position thereof which is indicated by broken line 130, having a slight curve matching the circular profile of the cylindrical shroud 102, and a bent section 124c projecting in the other direction from the original position 130. The sections 124a and 124c are interconnected by an intermediate section 124b disposed therebetween. The entire surface at both sides of the insert plate 120 is smoothly deformed to provide a flowing transition from the slightly curved front edge 122 to the severely twisted rear edge 124. The side edges 126 and 128 are cut to match the waved pattern of the air foils 108 so that when an insert plate 120 is placed in a space between two adjacent air foils 108, the side edges 126 and 128 are substantially in contact with the respective air foils 108 while the front edge 122 of the insert plate 120 extends between the outer front corners (not indicated) of the adjacent air foils 108 with the section 124a of the rear edge 124 substantially in contact with the cylindrical shroud 102. The skilled reader will appreciate in light of this disclosure that adjacent airfoils 108 and an insert 120 extending therebetween co-operate to form a exhaust mixer shape between them which is suitable for use in the particular engine for which they are designed. As such, airfoils 108 and inserts 120 may have any desired configuration. The configuration described herein is that of a combined duct and mixer similar in effect to known daisy mixer configurations.

A conventional securing means such as an annular bracket 144 is preferably attached to the rear end 106 of the cylindrical shroud 102 for supporting the engine tail plug 40 which is secured to the annular bracket 144 by for example, rivets 146.

Figure 2:
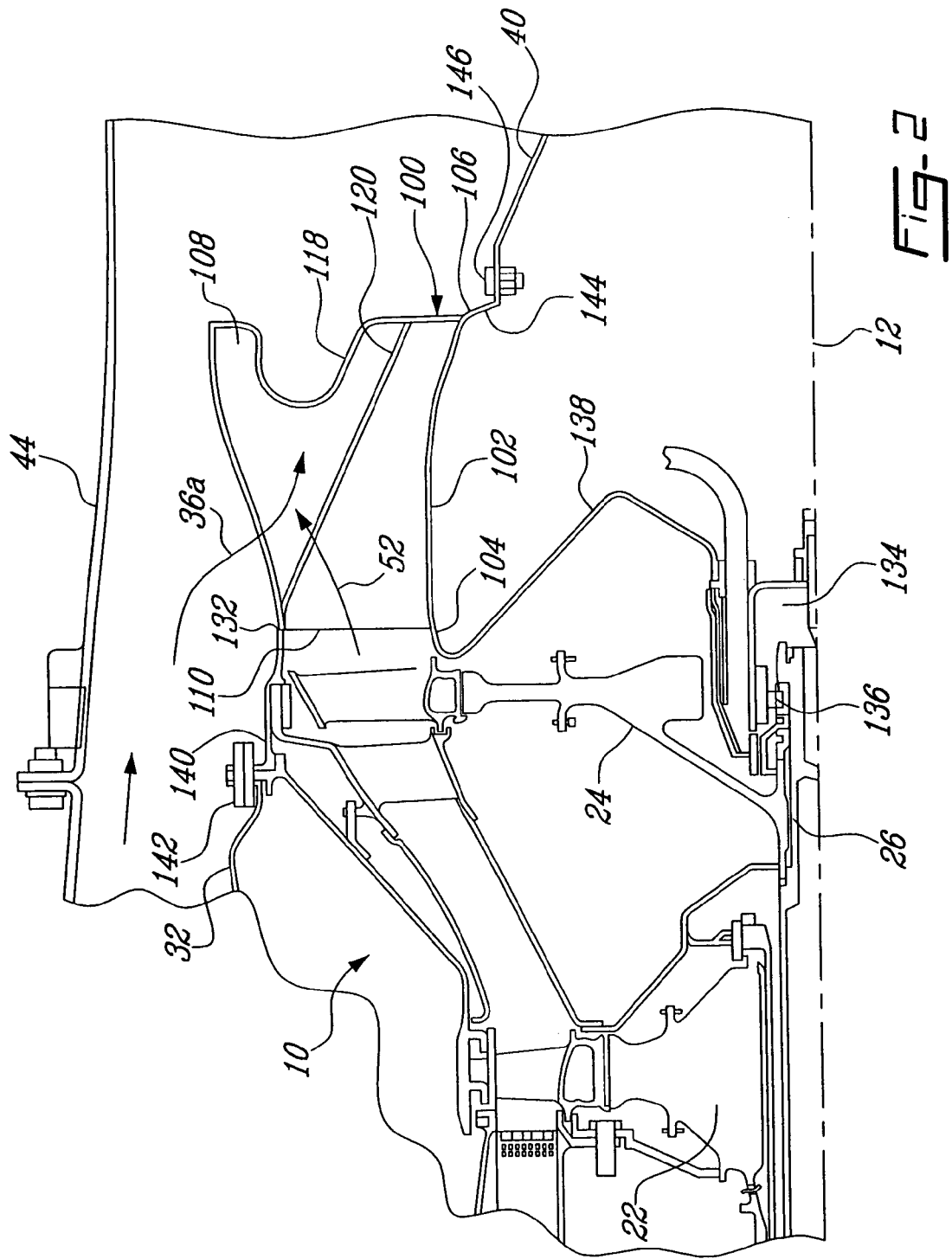
FIG. 2 is a partial longitudinal cross-sectional schematic view in an enlarged scale, of the gas turbine engine of FIG. 1, showing the installation of the embodiment of the present invention in detail.

In the assembly operation, the insert plate 120 is held in such a position appropriately by well known tools and is then for example, welded to the respective adjacent air foils 108 and to the shroud 102. Thus, the first side edge 126 of each insert plate 120 is connected to one of the adjacent air foils 108, extending substantially from the outer corner of said air foil 108 to a rear inner corner (not indicated) of same while the second side edge 128 of the insert plate 120 is connected to the other of the adjacent air foils 108, and extends substantially along the outer side 116 of that air foil 108. In such a configuration, the front edges 122 of the insert plates 120 form a circular front periphery 132 of the duct and mixer assembly 100, which is co-axial with front end 104 of the cylindrical shroud 102. Each of the insert plates 120 in combination with the corresponding adjacent air foils 108 and the cylindrical shroud 102, forms a first flow passage for directing combustion gases rearwardly in an axial direction and a second flow passage for directing a surrounding air flow, preferably the bypass-duct airflow 36a, in an axial, radial and inward direction when the duct and mixer assembly is installed on the engine 10. Furthermore, the section 124c of the rear edge 124 of the insert plate 120 projects outwardly so that the section 124c of the rear edge 124 is positioned radially apart from the central axis 12 (see FIG. 1) by a distance greater than the radius of the circular front outer periphery 132 of the duct and mixer assembly 100. Therefore, a portion of the insert plate 120 which forms the first flow passage, extends axially, radially and outwardly from the front edge 122 to the rear edge 124. The first flow passage thereby also directs the combustion gases radially and outwardly as shown in FIGS. 1 and 2 such that the duct and mixer assembly 100 efficiently mixes the hot combustion gases 52 and the cold bypass-duct airflow 36a, and generates a flow mixture to be discharged from the outlet end 50 of the nacelle 44 (see FIG. 1).

The welded insert plates 120 and the air foils 108 in combination with the shroud ring 102 form a stiffened and preferably rigid configuration which is strong enough to perform an exhaust duct casing function in order to support a turbine bearing cavity structure 134 which in turn accommodates and supports a bearing assembly 136. The bearing assembly 136 in turn surrounds and rotatably supports the first rotor shaft 26. The bearing cavity structure 134 is conventional and is attached to the front end 104 of the cylindrical shroud 102 by stationary structure 138 which is also well known in the art.

A flange ring 140 which preferably has a "L" shaped cross-section is secured, preferably by welding, to the front outer periphery 132. A plurality of mounting openings (not indicated) are provided in the radially outwardly extending section of the "L" shaped flange ring 140, permitting bolts 142 to pass therethrough in order to secure the duct and mixer assembly 100 to the engine casing 32.

Therefore, a gas exhaust duct is defined between the inner surfaces of the insert plates 120 and the outer surface of the shroud 102. The gas exhaust duct however, is circumferentially divided by the respective air foils 108 into the individual first flow passages such that the combustion gases 52 are directed by the divided flow passages (the first flow passages) through the gas exhaust duct. Meanwhile, the outer surfaces of the insert plates 120 in combination with the adjacent air foils 108, define the surrounding flow passages which are the second flow passages for directing the surrounding bypass-duct airflow 36a to mix with the combustion gases 52 discharged from the divided gas exhaust duct. The duct and mixer assembly 100 thereby performs a dual function as both a gas exhaust duct and as a mixer.

Most importantly, because the duct and mixer assembly 100 is a combination of an exhaust duct and a mixer performing the dual function of the both, the duct and mixer assembly 100 therefore requires only about half of the axial length of conventional gas exhaust ducts with a mixer. Accordingly, this configuration advantageously reduces the manufacturing costs and is lighter in weight in comparison to conventional cast exhaust ducts and mixers.

Modifications and improvements to the above-described embodiment of the present invention may become apparent to those skilled in the art. For example, the shape of airfoils 108 and inserts 112 may be any desired. Airfoils 108 need not necessary have an airfoil shape. Airfoils 108 and inserts 112 may be made by any suitable method, such as punched from sheet-metal, case, injection moulded, etc., and made from any suitable material. Attachement of the pieces of the device may be by any suitable method, such as welding, brazing, bonding, mechanical joint, etc. Though the elements hereof are disclosed as being mounted to an inner shroud only, and outer shroud may also be provided and used. The foregoing description, thus, is intended to be exemplary rather than limiting. The scope of the invention is therefore intended to be limited solely by the scope of the appended claims.

I claim:

1. A method of fabricating an exhaust duct and mixer assembly for use with a gas turbine engine, comprising:

providing an annular shroud;

forming a plurality of air foils, each having a front end, a rear end, an inner side and an outer side;

forming a plurality of insert members, each having a front edge, a rear edge, and first and second side edges defining a surface;

mounting the air foils to the shroud on a surface thereof in a circumferentially, substantially equally spaced-apart relationship;

securing one of the insert members to at least two adjacent air foils, thereby in combination with the adjacent air foils forming a first flow path along one side of the insert member for directing exhaust gases rearwardly and a second flow path along another side of the insert member for directing a bypass air flow rearwardly when the assembly is installed on the engine; and repeating the step of securing insert members until the assembly is completed.

2. A method as claimed in claim 1, wherein each of the insert members is placed and secured in a position in which the front edges of the respective insert plates in combination form a circular, front, outer periphery of the assembly co-axial with the cylindrical shroud.

3. A method as claimed in claim 2, wherein the first side edge of each insert member is connected to one of the adjacent air foils, extending substantially from a front and outer corner of the one air foil to a rear inner corner of same, and wherein the second side edge of each insert plates is connected to the other of the adjacent air foils, extending substantially along the outer side of same.

4. A method as claimed in claim 3, wherein a portion of the rear edge of each insert plate is positioned radially apart from a central axis by a distance greater than a radius of the circular front outer periphery of the mixer assembly when the insert plate is placed and secured in position.

5. A method as claimed in claim 2, further comprising:
forming a flange ring with mounting openings for bolted connection to a casing of the engine; and
securing the flange ring to the front outer periphery of the mixer assembly.

6. A method as claimed in claim 1, wherein the respective air foils are welded to the shroud.

7. A method as claimed in claim 1, wherein the respective insert plates are welded to the corresponding adjacent air foils.

8. A method as claimed in claim 1, wherein the shroud is adapted to form a section of an inner wall of a gas exhaust duct.

9. A method as claimed in claim 1, wherein the insert members are sheet metal.

10. A method as claimed in claim 1, wherein each insert member corresponds to only one mixer lobe of the assembly.

11. A method as claimed in claim 1, wherein the air foils are mounted to the shroud on an external surface thereof.

12. An exhaust assembly for a gas turbine engine, the assembly comprising:
an annular shroud;
a plurality of strut members extending radially in a circumferentially, substantially, spaced-apart relationship, each strut member having a front end, a rear end, an inner side and an outer side; and
a plurality of insert members extending between adjacent strut members and secured thereto, each insert member having a front edge, a rear edge, first and second side edges, the insert members co-operating with the adjacent strut members to form an exhaust air flow passage therebetween for directing exhaust gases rearwardly, the insert members having an outer surface adapted to direct surrounding bypass air flow rearwardly in a direction generally towards the exhaust air flow passage.

13. An exhaust assembly as claimed in claim 12, wherein the front edges of the respective insert members in combination form a circular front outer periphery of the exhaust assembly co-axial with the cylindrical shroud, the first side edge of each insert member being connected to one of the adjacent strut members, extending substantially from a front and outer corner of the one strut member to a rear inner corner of same, and the second side edge of each insert member being connected to the other of the adjacent strut member, extending substantially along the outer side of same.

14. An exhaust assembly as claimed in claim 12, wherein each of the insert members comprises a portion of the rear edge which is positioned radially apart from a central axis of the exhaust assembly by a distance greater than radius of the circular front outer periphery of the exhaust assembly.

15. An exhaust assembly as claimed in claim 13, further comprising a flange ring with mounting openings therein, the flange ring being secured to the front outer periphery of the exhaust assembly.

16. An exhaust assembly as claimed in claim 12, wherein the shroud is made of sheet metal.

17. An exhaust assembly as claimed in claim 12, wherein the strut members are formed with a wave pattern between the front and rear ends thereof.

18. An exhaust assembly as claimed in claim 12, wherein the insert members are made of sheet metal.

19. An exhaust assembly as claimed in claim 12, wherein the insert members are cast.

20. A method as claimed in claim 12, wherein the strut members are secured to an outer surface of the shroud.

21. An exhaust assembly as claimed in claim 12, wherein each insert members defines one mixer lobe of the assembly.

22. A gas turbine engine for use with aircraft including an gas exhaust duct assembly positioned downstream of a turbine rotor assembly with respect to a flow path through the engine, the gas exhaust duct assembly comprising:
an annular shroud forming at least a section of an inner wall of a gas exhaust duct;
a plurality of air foils radially projecting from an outer surface of the shroud, the air foils being disposed in a circumferentially, substantially equally spaced-apart relationship, and extending in a substantially axial direction;
a plurality of insert members, each defining a circumferential section of an outer wall of the gas exhaust duct and being positioned substantially between two air foils and secured to at least the two air foils; and
wherein the gas exhaust duct is defined at least partially between inner surfaces of the insert members and the outer surface of the shroud, and wherein the assembly is thereby adapted to direct exhaust gases rearwardly in an axial direction through the assembly.

23. A gas turbine as claimed in claim 22, wherein flow passages surrounding the assembly are defined between outer surfaces of the insert members and the air foils, the flow passage being adapted to direct a surrounding bypass air flow rearwardly in an axial, radial and inward direction.

24. The gas exhaust duct assembly as claimed in claim 22, wherein the gas exhaust duct assembly further comprises means attached to the cylindrical shroud for supporting a turbine rotor bearing assembly.

* * * * *

UNITED STATES PATENT AND TRADEMARK OFFICE
CERTIFICATE OF CORRECTION

PATENT NO. : 7,043,898 B2  Page 1 of 1
APPLICATION NO. : 10/600867
DATED : May 16, 2006
INVENTOR(S) : Giuseppe Rago It is certified that error appears in the above-identified patent and that said Letters Patent is hereby corrected as shown below:

In the claims:

claim 12, column 7, line 58, between "substantially," and "spaced-apart", insert --equally--

Signed and Sealed this

Twenty-second Day of August, 2006

JON W. DUDAS
*Director of the United States Patent and Trademark Office*